(12) United States Patent
Scherer

(10) Patent No.: US 6,961,637 B2
(45) Date of Patent: Nov. 1, 2005

(54) ON DEMAND ADAPTIVE CONTROL SYSTEM

(75) Inventor: Jerry G. Scherer, Ashton, IL (US)

(73) Assignee: GE Fanuc Automation Americas, Inc., Charlottesville, VA (US)

( * ) Notice: Subject to any disclaimer, the term of this patent is extended or adjusted under 35 U.S.C. 154(b) by 73 days.

(21) Appl. No.: 10/373,929

(22) Filed: Feb. 25, 2003

(65) Prior Publication Data

US 2004/0167659 A1 Aug. 26, 2004

(51) Int. Cl.$^7$ .............................................. G06F 19/00
(52) U.S. Cl. ............................ 700/173; 700/28; 700/32
(58) Field of Search ......................... 700/173, 28, 32–33, 700/175

(56) References Cited

U.S. PATENT DOCUMENTS

| | | | |
|---|---|---|---|
| 3,446,099 A | | 5/1969 | Lesher et al. ................. 77/32.4 |
| 3,728,595 A | | 4/1973 | Adams .......................... 318/39 |
| 3,849,712 A | * | 11/1974 | Lankford et al. ............. 318/561 |
| 4,150,327 A | | 4/1979 | Camera et al. ............... 318/568 |
| 4,237,408 A | | 12/1980 | Frecka ......................... 318/571 |
| 4,346,444 A | * | 8/1982 | Schneider et al. ........... 700/173 |
| 4,418,381 A | * | 11/1983 | Molusis et al. ................. 700/2 |
| 4,509,126 A | * | 4/1985 | Olig et al. ................... 700/173 |
| 4,547,847 A | | 10/1985 | Olig et al. ................... 364/148 |
| 4,698,773 A | * | 10/1987 | Jeppsson ..................... 700/160 |
| 4,787,049 A | * | 11/1988 | Hirata et al. ................. 700/173 |
| 5,083,280 A | | 1/1992 | Yamamoto et al. .......... 364/474.3 |
| 5,285,378 A | * | 2/1994 | Matsumoto .................... 700/37 |
| 5,315,789 A | | 5/1994 | Takashi ..................... 51/165.71 |
| 5,453,933 A | * | 9/1995 | Wright et al. ................ 700/181 |
| 5,727,912 A | * | 3/1998 | Rubashkin et al. .......... 409/132 |
| 5,780,725 A | * | 7/1998 | Tanaka .......................... 73/104 |
| 6,202,002 B1 | * | 3/2001 | Fainstein et al. ............ 700/175 |
| 6,384,560 B1 | * | 5/2002 | Kakino et al. .............. 318/566 |
| 6,476,575 B1 | * | 11/2002 | Fainstein et al. ............ 318/569 |
| 6,501,997 B1 | * | 12/2002 | Kakino .......................... 700/28 |
| 6,662,073 B1 | * | 12/2003 | Fujishima et al. ........... 700/173 |
| 6,728,594 B1 | * | 4/2004 | Kiernan et al. .............. 700/173 |

* cited by examiner

Primary Examiner—Leo Picard
Assistant Examiner—Alexander Kosowski
(74) Attorney, Agent, or Firm—Womble Carlyle Sandridge & Rice, PLLC

(57) ABSTRACT

An adaptive control system and method for controlling the path feed rate to achieve a target spindle load during machine tool operations. The adaptive control system can provide load monitoring capability, which will actively monitor an incoming load signal from a spindle drive and determine if it exceeds warning and alarm levels. If the incoming load being monitored exceeds the set warning level, a warning output is asserted and maintained until the incoming load falls below the set warning level. If the incoming load exceeds the set alarm level, the alarm output and feed hold output are asserted and maintained until an adaptive controller reset is requested. Normal cutting operations cannot resume until the conditions that generated the alarm level are addressed. Adaptive control of machine tool operations is provided by monitoring of the incoming load and requesting feed rate changes based on a proportional integral derivative (PID) controller algorithm. The adaptive controller monitors the incoming load until an arming limit is exceeded, at which point the adaptive controller proceeds to run the PID control algorithm to calculate a new feed rate that will cause the incoming load to obtain the user requested value. An interface application allows the user to set and view registers and the input/output status of the adaptive controller. The adaptive control system can be fully integrated into the machine tool management system, or can be integrated with custom tool interfaces. The adaptive control system can also be operated using a manual interface provided to the operator with no connection to tooling data.

41 Claims, 11 Drawing Sheets

ON DEMAND ADAPTIVE CONTROL SYSTEM

BACKGROUND OF THE INVENTION

The present invention relates generally to adaptive control of cutting operations on CNC operated machine tools. More specifically, the present invention relates to adaptively controlling the volumetric removal of material during the machining process.

Production requires that the time to produce parts must be minimized to increase production throughput. The throughput of the machine is affected by time during the process and any interruptions that occur during the machining process. Therefore, improving the rate at which material is removed and minimizing process interruptions due to premature tool wear or failure can decrease the machining time. Adaptive control has been used in the prior art to accomplish these functions, but the process has been difficult to set up and operate.

Among the difficulties in operating the adaptive control with computer numerical control (CNC) resources is that activation has been manual in nature. Attempts in the prior art to automate the activation of the adaptive control function has been clumsy in that temporal or geometric information must be known, and therefore detailed knowledge of the process must be known for activation.

The basic function of any CNC machine is automatic, precise and consistent motion control. All forms of CNC equipment have two or more directions of motion called axes. These axes can be precisely and automatically positioned along their lengths of travel. The most common axes types are linear and rotary. In general, the motion type, the axes to move, the amount of motion, and the feed rate are programmable with almost all CNC machine tools.

Almost all current CNC controls use a word address format for programming. By this, it is meant that the CNC program is made up of sentence-like commands. Each command is made up of CNC words. Each CNC word has a letter address and a numerical value. The G and M letter addresses allow special functions to be designated. The G preparatory function is commonly used to set modes. The M miscellaneous function is typically used as a programmable switch (e.g., spindle on/off).

SUMMARY

The present invention provides an interface for a machine tool user to more effectively employ the capacities provided by a Computer Numerical Control (CNC) machine. The adaptive control module of the invention controls the path feed rate to achieve the desired "target" spindle load being monitored. This module can be utilized in various configurations. In a first configuration (fully integrated), the adaptive control module is integrated into the machine's tool management system. In a second configuration (semi-integrated), the machine tool builder (or retrofitter) is provided with the capability of integrating the adaptive control module with custom tool interfaces. In a third configuration (stand alone) a manual interface is provided to the operator with no connection to tooling data.

All three configurations have the ability to display a user interface (more generally, an interface) for ease of adaptive control module setup, operation and maintenance. The User Interface (UI) can be implemented within the base control using proprietary customization features or within a personal computer (PC) using an open system interface to the CNC. Open system in the present invention refers to an open (i.e., non-proprietary) software interface. In either case, the UI is basically the same. The UI is made up of three basic screens: adaptive setup, PID Setup and PLC information.

The control of the path feed rate is performed by an adaptive control module (also referred to herein as adaptive controller) in the programmable logic controller (PLC), and performs modified Proportional-Integral-Derivative (PID) control calculations based on an analog representation of load. In most machining processes this load will be the spindle load, which is representative of the tool load. For this reason, the spindle drive used with the adaptive control module must have the capability of outputting an analog voltage, which represents the load presented to the spindle drive. This is usually not an issue, as most spindle drives have an analog output to which a meter can be connected to provide a visual indication of the spindle load. Adaptive load control below the base speed of the spindle should not be attempted. Stable control is difficult below base speed as the spindle is not within the constant horsepower region of the spindle motor's operation.

The UI communicates with the adaptive controller (PLC) over either an RS-232 serial link or CNC's programmable machine interface I/O structure. The Remote Terminal Unit (RTU) is a communications protocol used to send information over the serial link. A high speed I/O communication protocol can also be used to send information over the CNC's programmable machine interface I/O structure. With these protocols, registers within the adaptive controller can be viewed and edited, negating the need of programming software for the PLC. Communications packets are scheduled by the UI software on a regular basis to provide the user with information contained within the adaptive controller.

The objective of the adaptive control module is to assist the operator and programmer in the optimization of material removal to get the highest part throughput possible during the "roughing" and "semi roughing" processes in part production. The adaptive control module is generally not intended for use during the "finishing" process, as tooling loads will generally be very low and difficult to control. Furthermore, path feed rate variation might be undesirable (variable surface finish). The UI minimizes user input while maintaining a high degree of control with a flexible configuration. The goal has been to achieve ease of operation with integrated tool management and an advanced adaptive control unit.

DESCRIPTION OF THE DRAWINGS

The invention is better understood by reading the following detailed description of the invention in conjunction with the accompanying drawings.

DETAILED DESCRIPTION OF THE INVENTION

The following description of the invention is provided as an enabling teaching of the invention in its best, currently known embodiment. Those skilled in the relevant art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances and are a part of the present invention. Thus, the following description is provided as illustrative of the principles of the present invention and not in limitation thereof, since the scope of the present invention is defined by the claims.

The adaptive control module includes two components, to create the three configurations referred to above. These two components are the adaptive controller and the interface. The interface is optional for the operation of the adaptive control module, the adaptive controller is essential.

Figure 1:
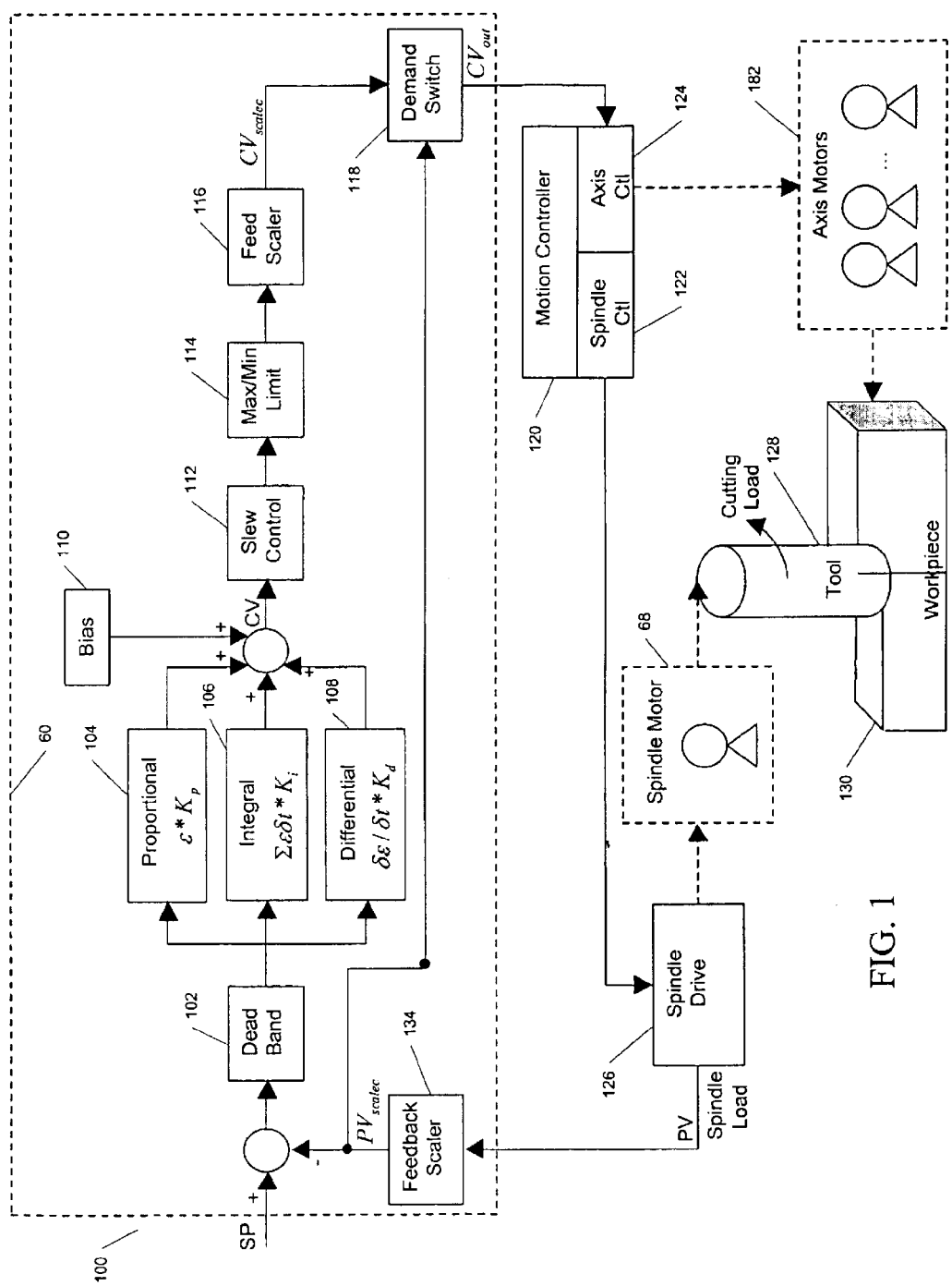
FIG. 1 illustrates a block diagram of the on demand adaptive control system in accordance with an exemplary embodiment of the invention.

FIG. 1 illustrates a block diagram of the on demand adaptive control system. The function of each block in the figure will be described in greater detail below. The adaptive controller 60 is comprised of both hardware and software. The adaptive controller 60 is a component of the programmable logic controller (PLC) and includes all of the functions necessary for performing adaptive machine control. One of these functions is the ability to receive an analog voltage (PV) and convert it into a binary representation that can be used in a mathematical control algorithm. Another function is the ability to accept and output binary information as 24-volt digital signals. In fact, the adaptive controller 60 has the ability to expand its on-board input/output structure by plugging in additional input/output modules into its expansion bus.

Although most PLCs have the ability to perform mathematical control algorithms, the PLC used with the present invention has built-in Proportional-Integral-Derivative (PID) function blocks 140, 106, 108 that perform most of the work of the adaptive control module 60 within 10 milliseconds. This time includes the over-sampling of the analog input to achieve input sample filtering. Using this method, the Signal to Noise Ratio (SNR) can be greatly improved without requiring special components and cabling.

The adaptive controller 60 receives external control data via the CNC's PMC I/O structure and the analog output (PV) from the spindle drive 126. The control data is made up of three pieces of information and individual inputs that tell the adaptive controller 60 the tasks to perform.

The adaptive controller 60 receives the following binary information externally:

1. Set Point (SP)—represents the desired load to be held by the spindle drive;
2. Warning Limit—represents the load level at which the controller will set a warning output bit;
3. Alarm Limit—represents the load level at which the controller will set a feedhold and an alarm output bit;
4. Enable Load Monitor—requests active monitoring of spindle load;
5. Enable PID Control—requests activation of adaptive control; and
6. Reset Controller—resets any pending alarms and PID loop control.

The first three pieces of information are 16-bit binary values that will represent the desired load at which the action should take place. The remaining information is in the form discrete inputs that will request the desired operation to take place.

Based on the above information and the analog load input, the adaptive controller 60 will provide the following binary outputs:

1. PID Active—the adaptive controller is active and calculating changes for analog output;
   Warning Active—the load monitor has detected load above the desired warning limit;
2. Alarm Active—the load monitor has detected load above the desired alarm limit;
3. Feedhold Active—the adaptive controller has detected an alarm and requests the CNC to stop motion;
4. Error—the adaptive controller has detected a control algorithm error condition; and
5. Speed Error—the adaptive controller has detected a spindle speed outside operational limits.

Each item of output information described above is in the form of discrete outputs that describe the condition of the controller 60. Along with this information is an analog output that will represent a Feedrate Override request that will bring the monitored load to the desired set point. The Feedrate Override information can also be transmitted over the CNC's programmable machine interface I/O structure when a serial link is not available.

The adaptive controller 60 communicates with the CNC through either a serial port on the PLC or the CNC's programmable machine interface I/O structure. The PLC actually has two serial ports available. The first or primary port is generally used for programming and debugging of the applications software within the PLC. To maintain this capability, while actively running the adaptive controller 60, the second secondary port is used for communications. The secondary port's hardware uses the RS-485 (multi-drop) standard. To make the RS-232 communication available, an RS-485/RS-232 converter is added. This converter is part of the adaptive control module 60. The output of the converter will be RS-232 compatible and is compatible with the serial ports on the CNC machine and personal computers. Alternatively, the CNC's programmable machine interface I/O structure can be used to communicate information between the PLC and CNC, if a serial port is either not desirable or available.

The adaptive control module 60 has two software components to perform the duties of an adaptive controller. The software component that allows the adaptive controller to perform its basic functions is the adaptive controller's firmware. The fiimware comes loaded on all PLCs and can be thought of as the operating system of the PLC. The application component software contains the control algorithms that perform the adaptive control.

Figure 11:
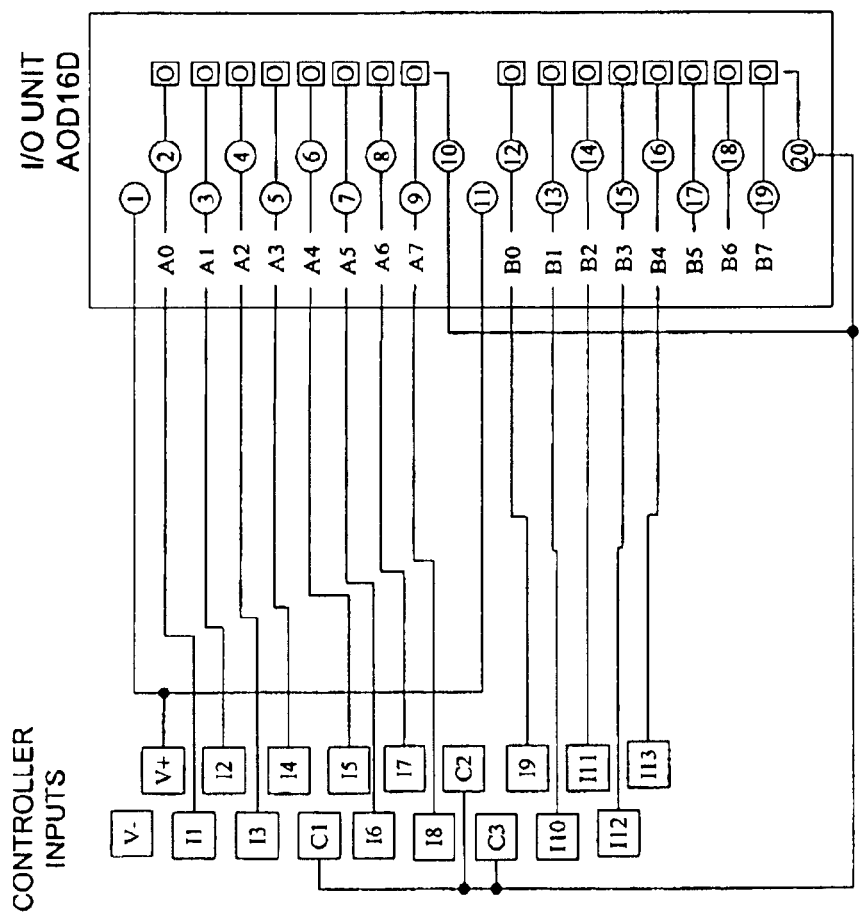
FIG. 11 illustrates a digital input connection between the adaptive control module and programmable machine controller.

The adaptive control application software component performs two main tasks during operation. The first task is to actively monitor the incoming load signal and determine if it exceeds the preset warning and alarm levels. This task can be activated by applying (or inhibited by removing) power to input 11 on the PLC. The digital input connections between the PLC and I/O interface are shown in FIG. 11. When the incoming load to be monitored exceeds the warning level set within the controller for a fixed period of time, approximately 0.25 seconds, the warning output Q4 (FIG. 13) will be asserted. This output will be maintained until the incoming load falls below the warning level to be monitored by the controller. In this manner, the warning output is self-resetting and no other action need be taken.

If the incoming load exceeds the alarm level set within the controller for a fixed period of time, approximately 0.25 seconds, the alarm output Q5 and feedhold output Q3 will be asserted. Unlike the warning output, the alarm output is not self-resetting and will be maintained until a controller reset is requested by applying power to the reset input 13. This action is taken to be sure that the conditions that generated the alarm level are addressed before normal cutting operations can resume.

The second main task of the application software component is to provide adaptive control through monitoring of the incoming load and requesting feedrate changes based on the PID controller algorithm. This task is activated by applying (or inhibited by removing) power to input 12 on the PLC. Upon activation, the PLC first resets the internal status of the PLC and initializes the PID control variables to those requested by the user. The controller 60 will then monitor the incoming load until the "arming" limit is exceeded, at which point the adaptive controller 60 proceeds to run the PID control algorithm to calculate a new feedrate that will cause the incoming load to attain the user requested value.

The controller 60 continues to calculate and request feedrate changes until the load goes below the "arming" limit. It then turns off the "PID active output", switches to "standby" mode and waits until the "arming" limit is again exceeded. In this way, the user does not need to know or program standoff distances and can operate the machine through interrupted cuts without shutting down the adaptive control. This greatly simplifies the operation and programming considerations of adaptive cutting operations.

With reference to FIG. 1, the adaptive control system 100 performs constant load machining by adjusting the axis path feedrate in response to load variations monitored at the spindle drive 126. The adaptive control system 100 comprises a spindle drive 126 which can output an analog (0–10 v) representation of the load at the drive, an adaptive controller 60 which calculates a path feedrate based on the difference between the target load and the load represented by the spindle drive 126, and a motion controller 120 which can accept path feedrate changes through an external input. During the machining process, the tool load can be approximated to the spindle drive load with a bias ($T_1 \cong S_1+b$). The tool load can also be approximated as inversely proportional to the axis path feedrate ($T_1 \cong 1/F_p$). Thus, it can be seen that the tool load can be controlled by monitoring the spindle load and adjusting the axis path feedrate ($T_1 = S_1+b=1/F_p => \Delta S_1 = 1/\Delta F_p$). These factors allow the machining process to be controlled with a negative feedback, closed loop control algorithm. The PID (Proportional/Differential/Integral) algorithm provides the best response to step input changes within a wide variety of process parameters and associated delays.

The independent term PID algorithm of the invention operates by monitoring two input variables and outputting a correction variable, such that the correction will drive the process to make the input variables equal to each other. The two input variables are called the "Set Point" (SP) and the "Process Variable" (PV), the output term is called the "Control Variable" (CV). Since the difference between the two input variables important to the PID algorithm and it is a negative feedback control loop, this quantity is called the "error term" ($\epsilon$=SP−PV). In the independent term PID algorithm, the error term ($\epsilon$) is observed and the corrective output term, control variable (CV), is calculated using the following equation:

$$CV=(K_p*\epsilon)+(K_i*\Sigma\epsilon\delta t)+(K_d*\delta\epsilon/\delta t) \quad (1)$$

where:

$K_p$=proportional gain;
$K_i$=integral gain;
$K_d$=differential gain.

It can be seen from equation (1) that the output control variable is made up of three terms. The first term is the proportional component of the corrective output (CV). It is calculated by multiplying the error term by a constant known as the "proportional gain" (block 104). This term is proportional to the difference between the set point and the process variable, its function is to apply a correction based simply on the difference between the set point (SP) and the monitored process variable (PV).

The second term is the integral component of the corrective output (CV). It is calculated by multiplying the accumulated error by the accumulated time and then multiplying this quantity by a constant known as the "integral gain" (block 106). This term applies a correction based on the accumulated error over time ($\delta\epsilon\ \delta t$), which will drive steady state errors to zero.

The third term is the differential component of the corrective output (CV). It is calculated by multiplying the change in error between the prior sampling of the monitored control variable (PV) and the current sample and dividing it by the change in time between the samples and then multiplying the product by a constant known as the "differential gain" (block 108). This term applies a correction based on the rate of change of the error term ($\delta\epsilon/\delta t$), which will attempt to drive constant changing errors to zero.

The PID control algorithm is a powerful method to calculate corrections to a closed loop process, but it can be overly sensitive to low-level noise or transients in the control loop. To overcome this issue, "dead band" control (block 102) has been added to the error term calculation, just prior to the PID calculations. The function of the "dead band" control is to suppress small changes in the error term, which can be magnified by the PID calculation, leading to unstable operation. The "dead band" control calculation is provided by setting the error term to zero, when the error term is below a threshold value. It can be expressed by the following pseudo-code:

If ($\epsilon$<dead band)

$\epsilon$=0 \quad (2)

Another issue with the PID control algorithm is that it is not sensitive to changes in inertial response. The machining process is traditionally accomplished through the removal of material, thus changing the mass of the closed loop system results in a change in forces. If the control system is tuned using very low inertial mass, the control may become unstable when the inertial mass is significantly increased. This could lead to corrective solutions that could saturate (or overwhelm) the path axes moving the workpiece. To address this condition, a slew control algorithm has been added to the output of the PID calculation (block 112). The slew control only allows the corrective output to change by a maximum amount. If the output of the PID calculation exceeds the prior solution by the slew limit, the new solution is clamped at the sum of the prior solution and the slew limit. Since the rate of change is clamped, the solution will be clamped to a fixed amount, which will limit the forces due to inertial response of the machine. The slew control can be expressed by the following pseudo-code:

If ($\Delta CV$<slew limit)

$CV=CV_{last}$+slew limit  (3)

Thus it can be seen that $\Delta CV$ is an acceleration and from Newton's Law (F=ma), the following:

$F=m\Delta CV$  (4)

By limiting the rate at which CV can change, the inertial response and resultant forces can be limited, and higher gains can be provided in the PID loop.

Another issue that needs to be addressed is that the PID calculation could result in solutions that exceed the axis path feedrate of the machine or with a negative feedrate (erroneous condition). To overcome this condition, a minimum/maximum clamp algorithm (block 114) has been added. If the corrective output either exceeds the maximum limit or drops below the lower limit, the output will be clamped to that limit. The minimum/maximum control can be expressed by the following pseudo-code:

If (*CV*>Maximum Clamp);

CV=Maximum Clamp;

If (CV<Minimum Clamp);

CV=Minimum Clamp.  (5)

Once a corrective solution has been calculated and processed through the controls described above, the solution needs to be scaled to match the axis path feedrate command input of the motion controller. Since different controllers have different requirements, a scaler algorithm (block 116) has been added to properly match the requirements of the motion controller with which it is integrated. The scaler algorithm can be expressed by the following equation:

$CV_{scaled}=CV$*Scale Factor  (6)

The key feature of this adaptive control system is the "demand switch" algorithm (block 118) that simplifies the operation. The demand switch functions by automatically activating and de-activating the adaptive control system based on the load being monitored. This allows the user to either manually or programmatically "enable" the adaptive control feature, but it will only activate as needed.

The activation/de-activation of the adaptive control is based on the monitored load exceeding or dropping below a preset "arming limit" respectively. Thus, if the user has enabled the adaptive control, the controller 60 will actively send corrective solutions to the motion controller 120 once the monitored load has exceeded the "arming limit" preset by the user. The adaptive controller 60 will continue to calculate and send corrective solutions to the motion controller 120 until the monitored load drops below the arming limit" plus an offset.

This arming limit offset is adjustable and allows the controller 60 to incorporate a "hysteresis" in the activation/de-activation condition. Hysteresis overcomes a possible condition where unstable or "discontinuous" operation could result when the monitored load is equal to the arming limit.

The "demand switch" has not been available on prior versions of adaptive control systems as they were also used for broken tool detection. To provide broken tool detection the adaptive control unit 60 monitors when the monitored load drops below a threshold value, since when a tool breaks there is usually no engagement between the tool 128 and the workpiece 130 resulting in no tool load. By removing the broken tool detector, the adaptive control 60 can detect when the tool 128 is engaged with the workpiece 130 and when it is not. Thus, this makes the adaptive control an "on demand" control system simplifying operation.

With prior versions of adaptive control, the operator has needed to know either temporal or positional information about the machining process to activate the controller. This has lead to complicated programming and operation rules that are necessary for satisfactory operation of the adaptive controller. One issue that is difficult to overcome with prior versions of adaptive controllers is the "interrupted cut". When the machining process comes to an area where there is no material (i.e. a hole in the part), the adaptive controller 60 will increase the axis path feedrate to attempt to increase the load. The adaptive controller 60 will ultimately request the maximum path feedrate to attempt to increase the load. The result is the tool 128 proceeding through the "interrupt" at maximum speed and engaging the tool 128 with catastrophic results.

The "demand switch" overcomes these issues because activation is based on load and not temporal or positional information. When the adaptive control is enabled, but not yet activated, the corrective output (CV) is held to the programmed axis path feedrate of the motion controller 120. When the monitored process variable (PV) exceeds the "arming limit", the corrective output CV is based on the PID control and auxiliary corrective algorithms described above. When the monitored process variable drops below the arming limit plus an offset, the corrective output (CV) is again held to the programmed axis path feedrate of the motion controller. The "demand switch" algorithm can be expressed with the following pseudo-code:

If ($PV_{scale}$>arming limit)

$CV_{out}=CV_{scale}$;

Else if ($PV_{scale}$<arming limit+offset)

$CV_{out}$=programmed feedrate.  (7)

It is possible that during adaptive control the commanded load can be too low for the process. This can be demonstrated by commanding a set point load, which necessitates an axis path feedrate slower than 1% of the commanded feedrate. In this case when the feedrate override drops below 1% to 0%, the axes will stop motion and the tool will relieve itself to a no-load condition. This will result in the "on demand" adaptive control immediately resetting the commanded feedrate override to 100%, as it has detected a "no-load" condition.

To overcome this situation, the adaptive controller provides low feedrate protection. When the adaptive controller detects that the feedrate override has dropped below a preset level, approximately 5%, the controller will issue a feedhold request to the CNC and wait for the user to take appropriate corrective action. The low feedrate override protection algorithm can be expressed by the following pseudo-code:

If ($CV_{out} < FOV_{limit}$)

$$FeedHold_{out} = 1 \tag{8}$$

One last condition that the PID calculation cannot address is the scaling of the spindle drive 126 feedback to match the programmed load set point (SP) with the monitored process variable (PV). Some spindle drives provide an output based on the peak load that the drive is currently outputting to the motor. Other drive systems provide output based on an average load output RMS (root mean square). The operation of the adaptive controller 60 can be confusing if the programmed output does not match the monitored feedback. Since different spindle drives 126 have different output capability, a scaler algorithm (block 134) has been added to properly match the capability of the spindle drive with which it is integrated. The feedback scaler algorithm can be expressed by the following equation:

$$PV_{scaled} = PV * \text{scale factor} \tag{9}$$

By changing the axis path feedrate by an augmented PID algorithm as described above, the tool load can be simply and easily controlled.

The adaptive control module was developed to incorporate a simple method of setting, controlling and viewing the adaptive machining process. Any of the three configurations referred to previously can utilize the user interface (UI) software for setup and monitoring of the adaptive control module. Only the fully integrated and semi-integrated configurations can utilize the setting capabilities of the UI software.

The UI software allows the user to set and view registers and the I/O status of the controller. This allows the user to setup and operate the adaptive control module without the need for additional programming software. The UI software has been developed for both standard and open system based controls. The UI software can be implemented in an open system as a Microsoft Windows application. In a standard based control, the UI software can be implemented using the proprietary customization feature feature. In either case, the user interface screens and methods of operation are similar.

Figure 2:
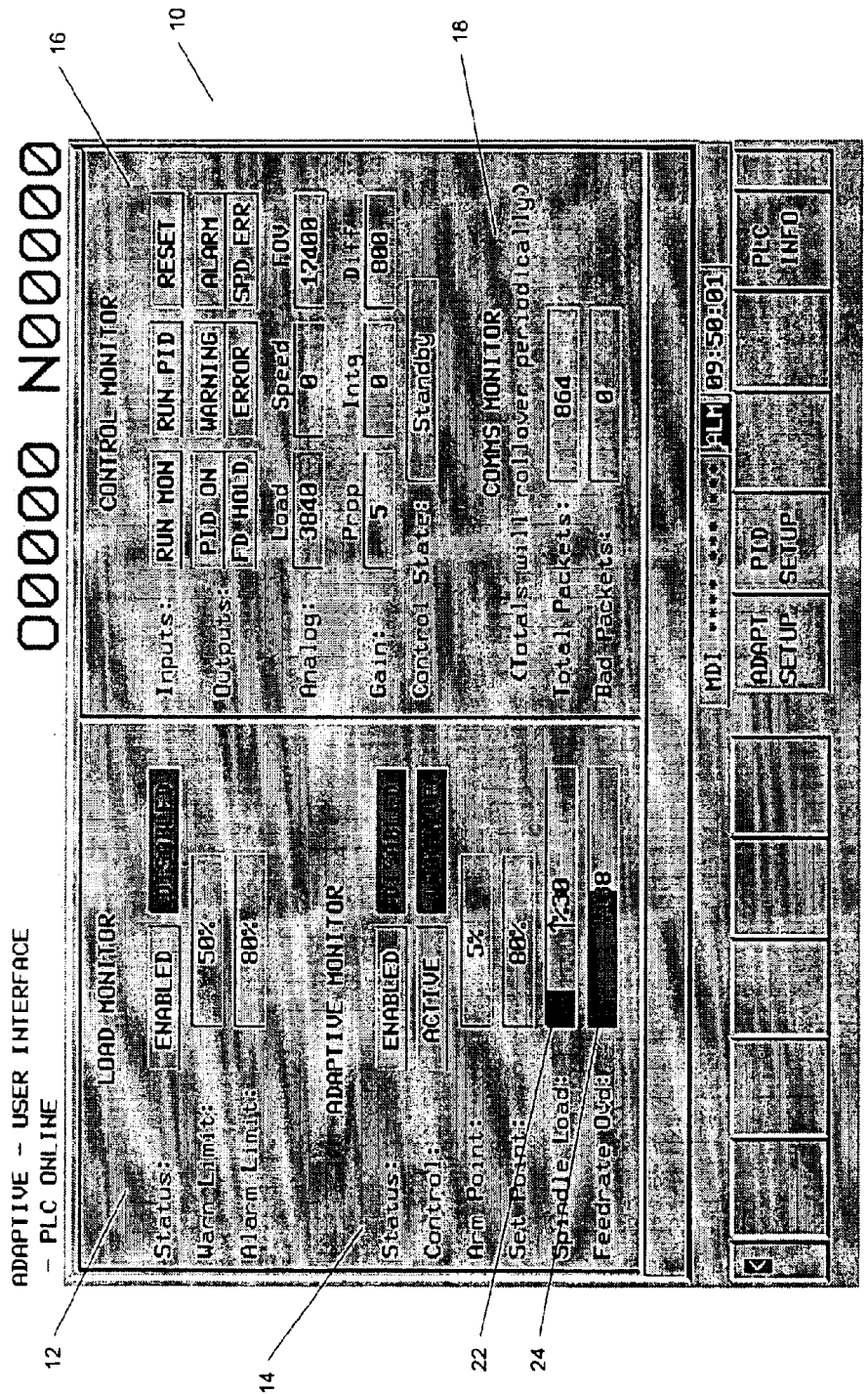
FIG. 2 illustrates an exemplary adaptive control user interface display screen.

One main screen and three sub-screens are a part of the UI software. The main screen 10 illustrated in FIG. 2, includes four areas 12, 14, 16, 18 of monitored information. These four areas are further divided into a "left-hand" side and "right-hand" side of the screen display. The "left-hand" side of the screen depicts information that an operator needs to know during operation of the CNC machine. The "right-hand" side of the screen displays information that an operator or maintenance person needs to verify setup and proper operation of the control system. Therefore, the "left-hand" side of the screen contains operational information and the "right-hand" side of the screen contains debug information.

The first area 12 within the operational information area of the UI is the "Load Monitor", which displays the active status of the load monitor, along with the warning and alarm levels preset by the user. The second area 14 displays the "Adaptive Monitor" information, which displays the active status and control status of the adaptive control algorithm. The "Arm" and "Set" point targets are displayed, informing the operator of the current levels. Within the "Adaptive Monitor" area 14, there are also two bar indicators 22, 24 to inform the operator of the current spindle load level and the feedrate override being requested by the adaptive control software, respectively.

The third area 16 is within the debug information area of the UI 10 and is the "Control Monitor", which displays an image of the PLC controller's I/O. This can be the primary debug tool when attempting to troubleshoot any difficulties with the adaptive control module. The fourth area 18 is also within the debug information section of the UI 10 and is the "Communication Monitor". This area displays the current state of communications between the UI and the PLC controller. Each time a packet of data is sent to, or received from the PLC controller, the packet totals will increment. With this information, the operator or maintenance personnel should be able to determine if there are any communication difficulties. Since the communications of the UI are asynchronous to its operation, the packet totals increment on a regular basis in normal operation.

Figure 3:
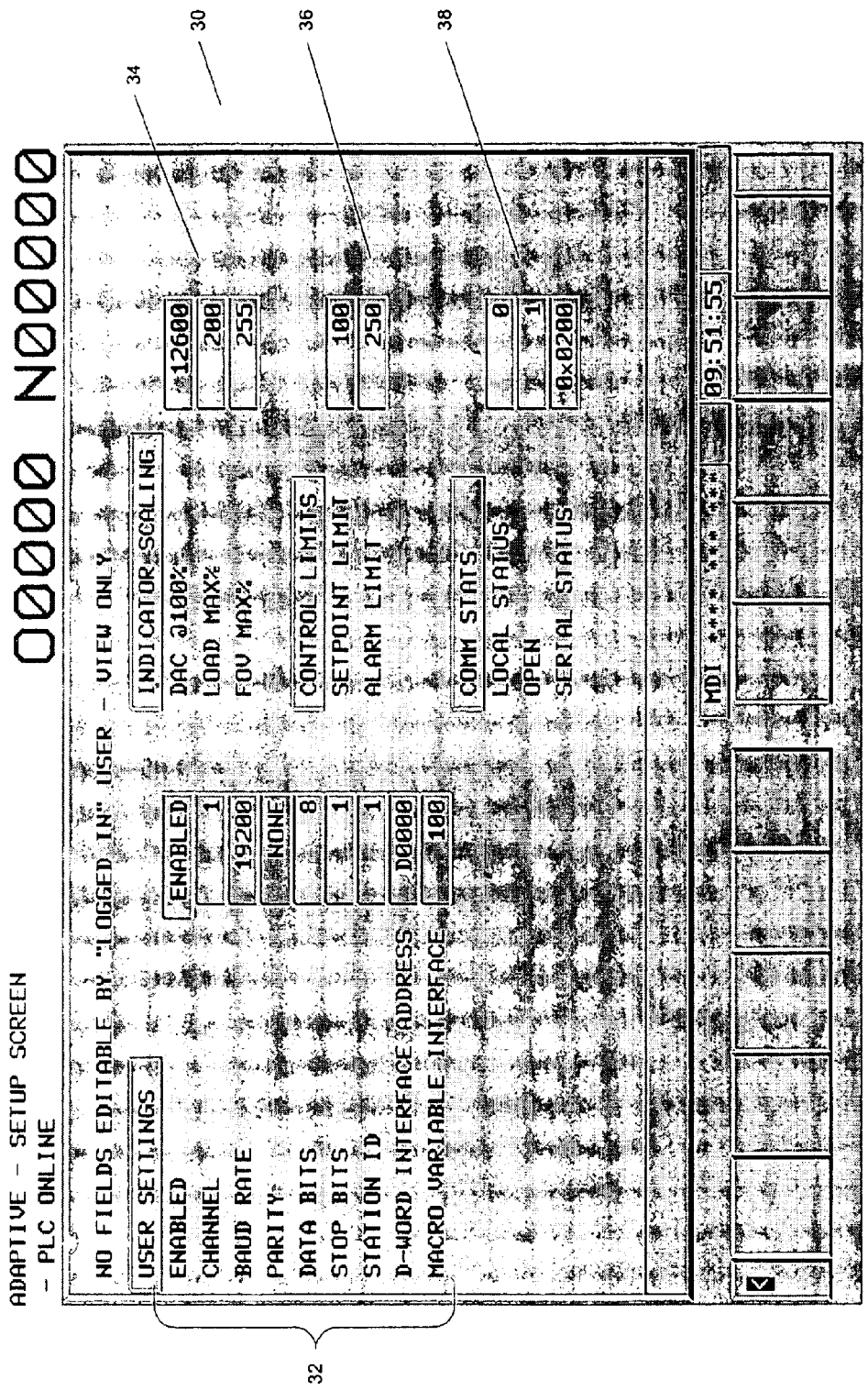
FIG. 3 illustrates an exemplary adaptive control user interface setup display screen.

The UI sub-screens are for setup and debug information only. Depending on the status of the controller and the privilege level of the operator, some screens might not be available. The first of the sub-screens, illustrated in FIG. 3, is the "Adaptive Setup" screen 30. With this screen, the user can edit and setup the serial communication parameters, on-screen scaling, control limits and monitor communications status.

The first seven fields within the user settings 32 are communication parameters between the UI and PLC controller. The settings should be the same as those on the PLC controller. The next two fields allow the user to establish the areas within the PMC and macro variables where adaptive control information can be found. Although the indicator scaling 34 and control limit 36 settings are initially set on installation, the user can adjust these settings to reflect the desired values for operation.

The "Comm Status" fields 38 are read-only and cannot be changed by the user. These fields are for diagnostic purposes and reflect the status of the serial communications port.

Figure 4:
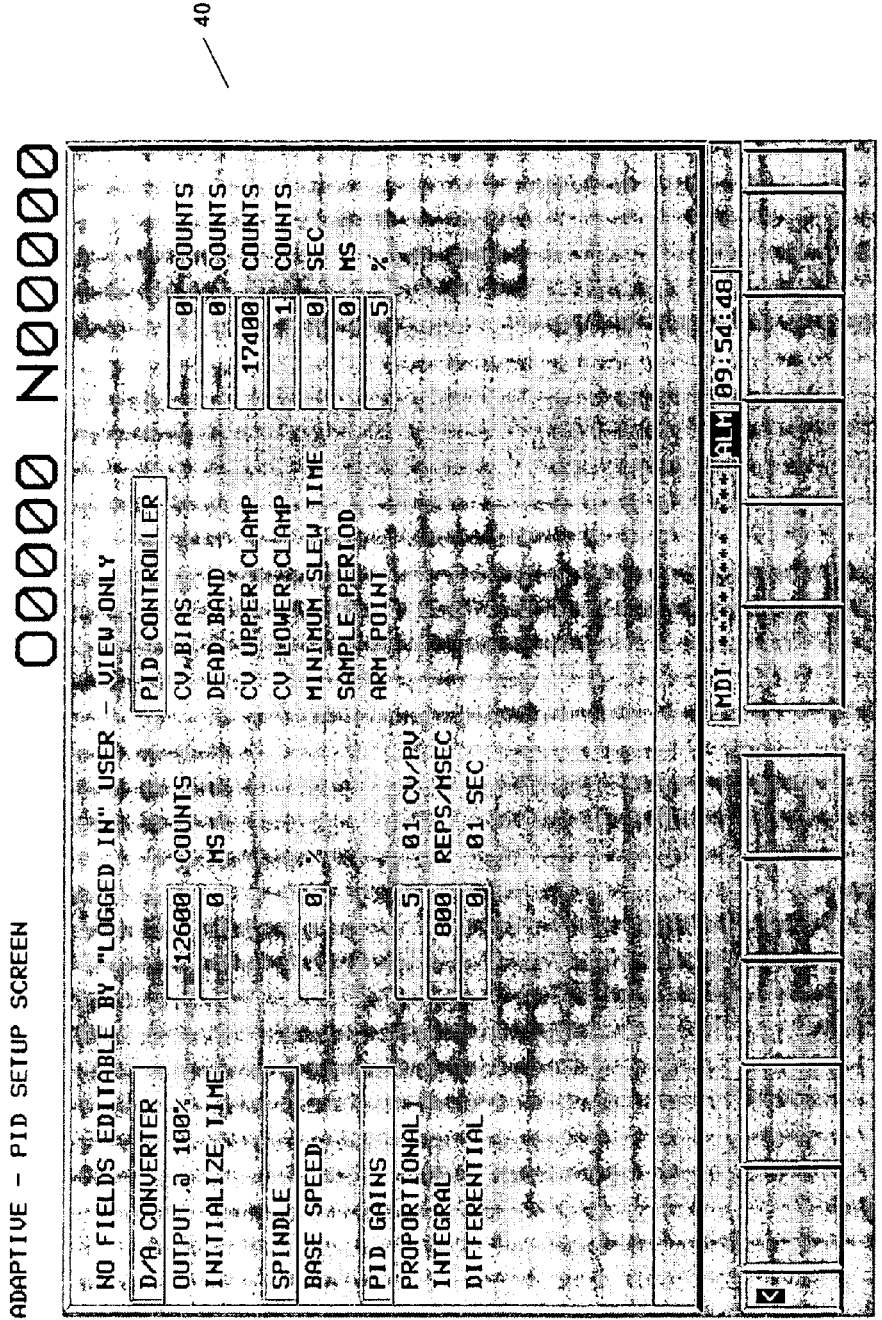
FIG. 4 illustrates an exemplary user interface setup display screen for a proportional-integral-derivative control function of the adaptive control module.

The second UI sub-screen, illustrated in FIG. 4, is the "PID Setup" screen 40. This screen is used to set the control characteristics of the PID control algorithm within the PLC controller. With the exception of two fields, each field presents information in units "normal" to the PLC's operation.

Figure 5:
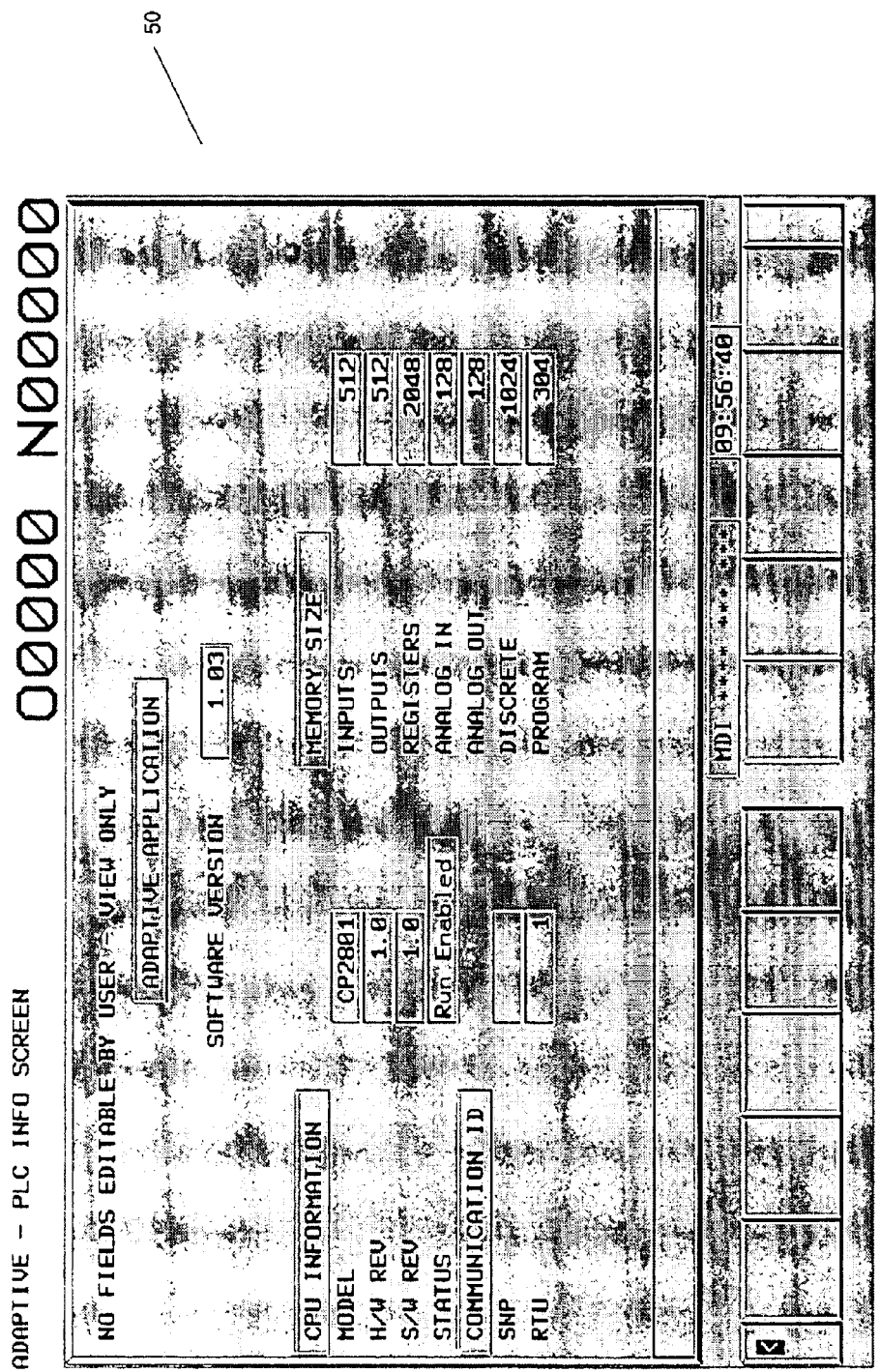
FIG. 5 illustrates an exemplary adaptive controller information display screen.

The third UI sub-screen, illustrated in FIG. 5, is the "PLC Information" screen 50. This screen provides information about the PLC controller. All of the fields on this screen are read-only. If any difficulties are encountered in normal operation of the adaptive control module, factory personnel might request information from this page to aid in troubleshooting.

To further aid the operator and factory personnel, a "log" file capability is available to document various registers within the adaptive control unit. The log file provides the ability to "time-stamp" entries as they are written to the file. In this manner, items, such as spindle load, can be periodically saved to the log file along with the current time and date. This allows the user or other factory personnel the capability of analyzing the process for further enhancement.

The log file capability allows the user to enable and select a name for the file under which it will be saved. Items such as spindle load, spindle speed and feedrate override can be selected and a custom scale can be applied to each, outputting readable values to the user file. The update rate is also selectable by the user to allow the optimum amount of data to be stored.

In many instances, the UI software is made up of multiple tasks running within the hardware in which it is installed. This means that the software is able to perform parallel operations to increase the overall efficiency of the system. In this manner, the operations, which make up the UI, are able to execute at their own rates and increase the overall speed and responsiveness to not only the controller, but also the user.

As noted above, the adaptive control module can be configured in one of three ways, depending on the user needs and machine tool capability. These configurations are now described in more detail. Many other configurations can be obtained through variations of the three main types.

Figure 6:
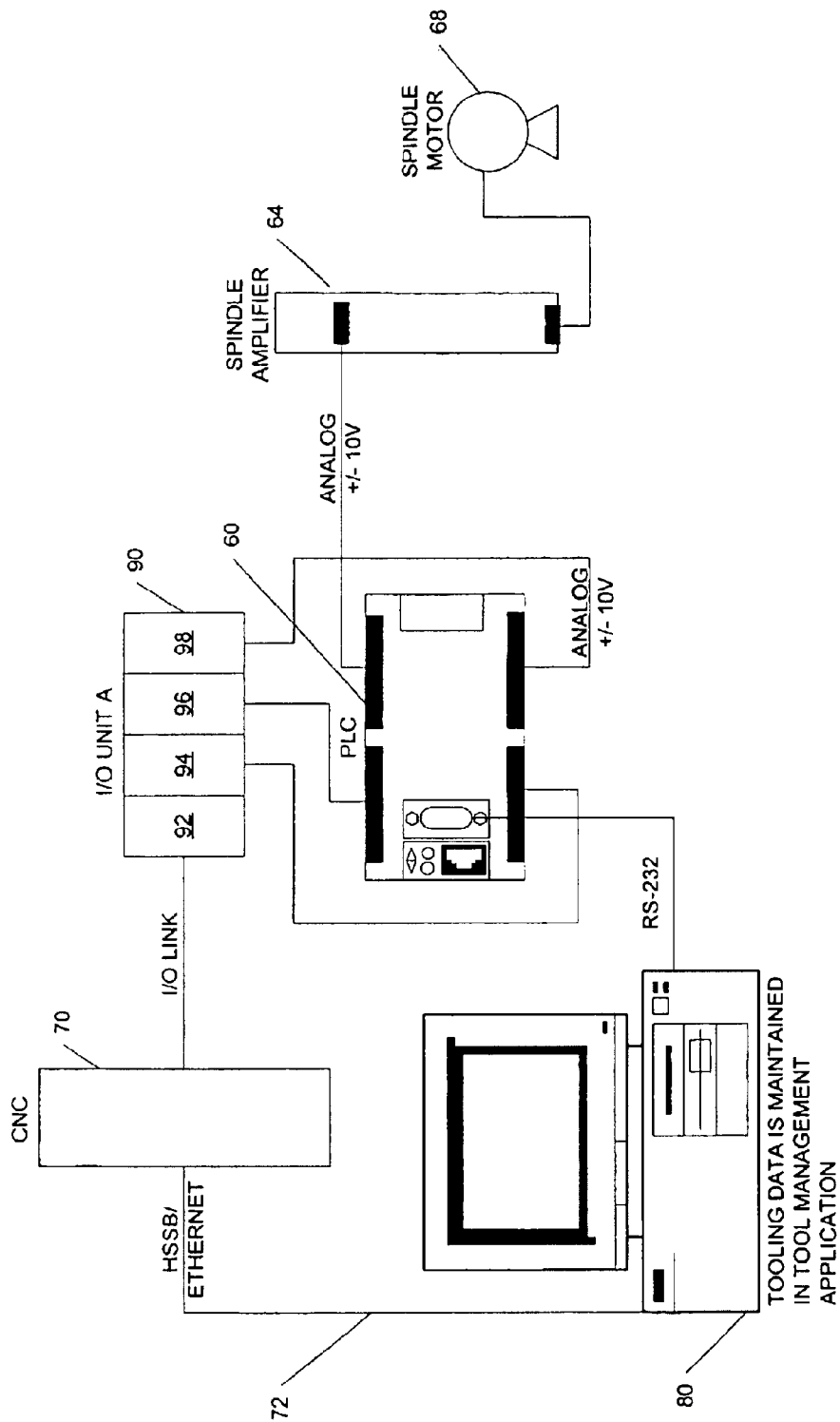
FIG. 6 illustrates a block diagram of an adaptive control system in a fully integrated configuration.

The greatest capability in the adaptive control module is obtained by using the fully integrated configuration as illustrated in FIG. 6. In the fully integrated configuration, the PLC controller 60 is tied into the CNC 70 (and in the case of an open system interface, the personal computer 80) for both user interface information and tooling information. In this configuration, tool management software is used to store and manage adaptive control information along with the tooling information. Communications between CNC 70 and personal computer 80 (i.e., open system) takes place over a high-speed serial bus (HSSB) or Ethernet connection. HSSB connectivity provides a high performance, proprietary serial link. The HSSB bus consists of two interface cards and a fiber optic cable. This linkage provides two-way data transfer at very high speeds.

Figure 7:
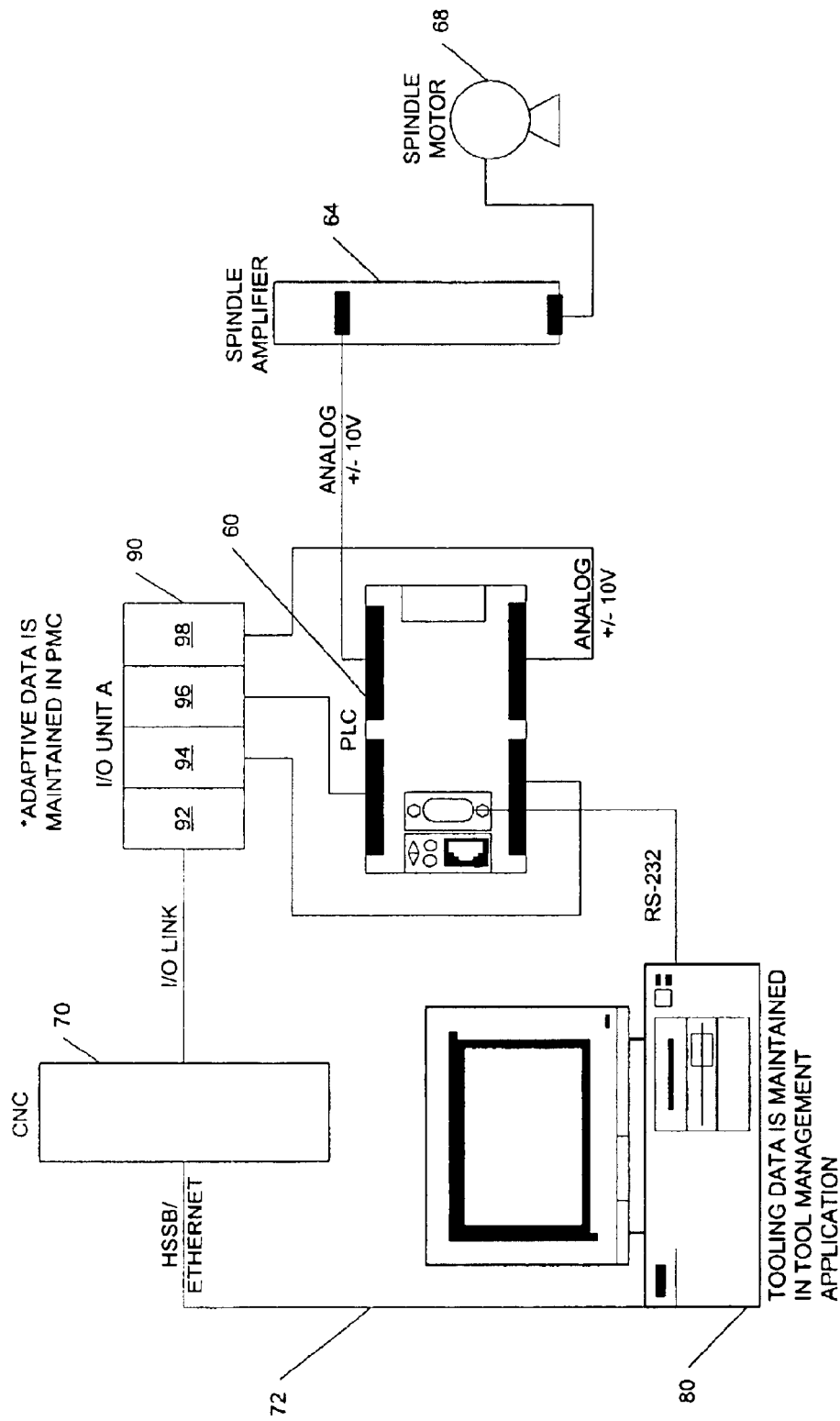
FIG. 7 illustrates a block diagram of an adaptive control system in a semi-integrated configuration.

The next level of integration in the adaptive control module is obtained by using the semi-integrated configuration, as illustrated in FIG. 7. In the semi-integrated configuration, the PLC controller 60 is tied into the CNC 70 (and in the case of an open system interface, the personal computer 80) for user interface information. The tooling and related adaptive control information is maintained in the programmable machine controller (PMC) interface 90. This configuration allows the adaptive control module 60 to work with custom tool interfaces developed by the machine tool builder (MTB) for different machine lines.

Figure 8:
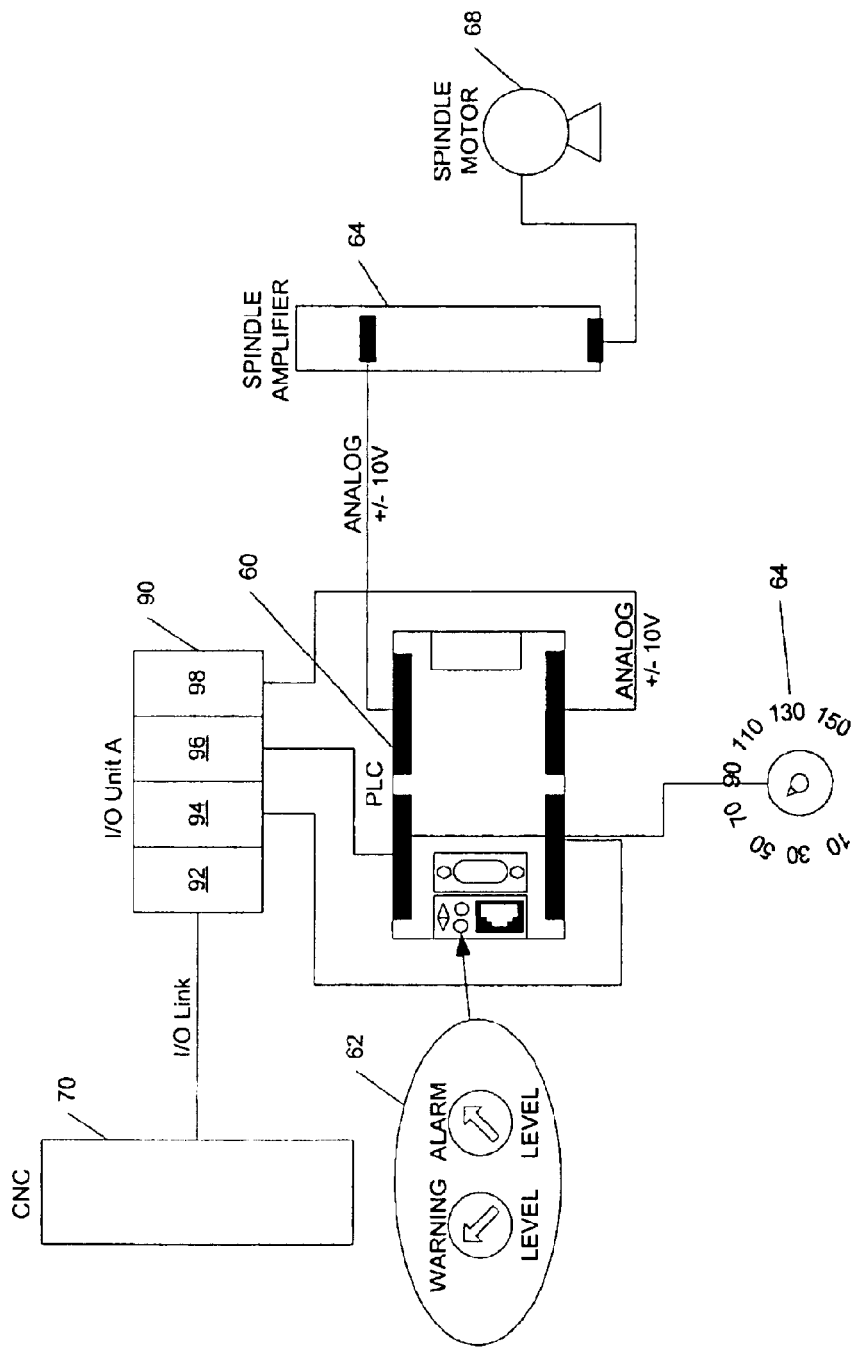
FIG. 8 illustrates a block diagram of an adaptive control system in a stand-alone configuration.

The least amount of integration in the adaptive control module is obtained by using the stand-alone configuration, as illustrated in FIG. 8. In the stand-alone configuration, the adaptive controller 60 is provided a user interface through hard inputs 62, 64 on the adaptive controller. Unlike the other configurations, tooling and related adaptive information is not provided to the adaptive controller. This configuration allows the adaptive control module to work with any CNC, but relies on the user to select the proper target and limits through external devices connected to the controller.

An enhanced tool manager (ETM) application manages all of the CNC machine's tooling information in one area using one interface. With this feature, there is no need to navigate through several screens to enter and maintain tooling information. All of the tooling information, from length and radius to desired load and speed, is maintained using one user interface.

The user can obtain all the benefits from the adaptive control system by utilizing the fully integrated configuration. In this configuration, the ETM (enhanced tool manager) is used to integrate all tooling information into one area of management, including the adaptive control information.

Typically, a CNC G-Code (preparatory function command) or M-Code (miscellaneous function command) will be used to activate (and deactivate) the adaptive control module 60, although a pushbutton or switch can also be used. The two functions supported by the adaptive control module 60 are tool load monitoring and tool load control (i.e., adaptive control).

Tool load monitoring is usually activated with an M66 command and deactivated with an M67 command. When the tool load monitoring feature is active, the adaptive controller 60 monitors the spindle load and outputs a warning or alarm when these thresholds are exceeded for a preset period of time. The adaptive control module 60 can be programmed to use these outputs to generate user messages and trigger events.

The warning output from the adaptive controller 60 is self-resetting in that when the monitored spindle load drops below its warning threshold, the output turns off. The alarm output is different in that when the alarm threshold is exceeded, the output is maintained even when the monitored spindle load drops below its threshold value. In addition to the alarm output being generated, a feedhold request and error outputs are also set. To turn off these outputs and restore normal operation, the adaptive controller's reset request must be turned on momentarily.

The load adaptive function is usually activated with an M64 command and deactivated with an M65 command. The function is enabled by user request and activated when the spindle load exceeds the "arm" point set by the user. When the load adaptive function is active, the controller requests feedrate changes based on maintaining a target load requested by the user.

The calculation for feedrate control is based on the assumption that the cutting load is proportional to the path feedrate. Even in cases where this is not strictly correct, the algorithm produces stable operation when tuned correctly. The path feedrate is determined using a PID (Proportional-Integral-Derivative) algorithm that monitors the incoming spindle load and the user's target load set point.

The PID control algorithm internally works in units based on the full-scale input of the analog to digital converter (ADC) of the controller. For this reason, scaling multipliers are applied to the controller's inputs to match the spindle output, target set point and the feedrate request being calculated by the adaptive controller 60. The person integrating the adaptive control module during setup establishes these scaling multipliers. There should be no need to change the scaling multipliers after installation has been completed.

The path feedrate control is actually performed in the CNC machine 70 using feed rate override. A typical installation provides the adaptive feedrate override through logic in the programmable machine controller (PMC) 90, which will multiply the adaptive feedrate override by the user feedrate override (machine operator's panel). Although the operator might request a change in feedrate override from the machine operator's panel, the adaptive control module 60 will quickly override the user input by requesting a change in it's own feedrate override value. In this manner, the operator's feedrate override value will take effect when the adaptive control function is not active.

An issue that has plagued adaptive controllers is that of interrupted cuts. The problem occurs when the controller breaks through continuous material into an opening, the monitored spindle load then dropping off to the "idle" load of the spindle. In this case, the adaptive algorithm will attempt to increase the path feedrate until it either clamps at maximum axis speed or saturates the command input of the CNC feedrate control. In either case, the PID algorithm is no longer in control and will quickly saturate its calculations.

The issue comes into play when the machine moving at a high rate of speed engages the part again. This quickly overloads the tooling and can result in breakage and damage to the machine.

Some early methods to overcome this condition were based on knowledge of the location of these interrupted cuts or time delays imposed by the PLC controller when this condition existed. Both of these methods have worked, but it entails knowledge of the part geometry and timing of these events.

The adaptive control module 60 uses a different method to overcome the issue of interrupted cuts. Requesting the activation of the load control function does not mean the controller 60 will start requesting path feedrate changes. Active control does not begin until the monitored spindle load exceeds an "arming" point set by the user. This point not only controls when the path feedrate control becomes active, but also when it is disabled.

While the adaptive control module is controlling the feedrate it is actively checking the spindle load to determine if it has fallen below the "arming" point set by the user. If the spindle load does drop below the "arming" point, the controller 60 will disable feed rate control and reset its PID algorithm, again waiting for the load to exceed the "arming" point. In this manner, the load control function can be kept active during interrupted cutting without the knowledge of part geometry and the imparting of delays within the controlling algorithm.

The connection between the adaptive control module and the CNC machine is both hardware and software. These connections can also involve a user personal computer (PC) in the fully integrated or semi-integrated configurations are used. Although only three types of configurations are discussed herein, many derivatives of these three types can be employed for a particular machine. The CNC 70, PLC 60 and optionally a user PC 80 need to communicate with each other to setup and operate the adaptive control module function. The optional user PC 80 can be either provided as an external unit or integrated into the CNC machine 70.

Figure 9:
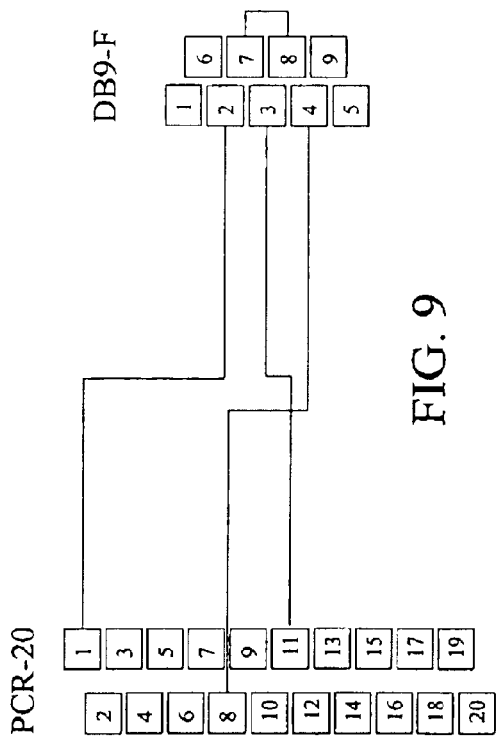
FIG. 9 illustrates a three-wire connection between the adaptive control module and the CNC using a serial communications cable.

In the proprietary customization feature version of the adaptive control module 60, the CNC machine 70 provides the serial resource for communications between the adaptive controller (PLC) 60 and the CNC 70. For this reason a simple serial connection is needed between the two units. This serial cable does not need to provide hardware handshaking, so only a three-wire connection is needed. This cable connects to the CNC's serial port at JD36A (or JD36B) and the SNP to RS232 Converter on the PLC's port #2. FIG. 9 illustrates the three-wire connection between adaptive controller 60 and CNC 70.

The CNC I/O hardware 90 is where most of the connections will be provided between the controller 60 and the CNC 70. The connections are provided through PMC I/O points that are mapped into PMC logic. This mapping is accomplished by programming the PMC 90 with the required number of inputs and outputs necessary for the application.

Table 1 lists the controller I/O points that are provided on the adaptive controller:

TABLE 1

| Description | Input Address | Output Address |
| --- | --- | --- |
| Analog Spindle Load | IN1+/− | |
| Analog Spindle Speed | IN2+/− | |
| Request Load Monitor | I1 | |

TABLE 1-continued

| Description | Input Address | Output Address |
| --- | --- | --- |
| Request Load Adaptive | I2 | |
| Request Controller Reset | I3 | |
| Manual Command Request | I4 | |
| Manual Command Bit-1 | I5 | |
| Manual Command Bit-2 | I6 | |
| Manual Command Bit-3 | I7 | |
| Manual Command Bit-4 | I8 | |
| Manual Command Bit-5 | I9 | |
| Manual Command Bit-6 | I10 | |
| Manual Command Bit-7 | I11 | |
| Manual Command Bit-8 | I12 | |
| Manual *Read/Write | I13 | |
| Analog Feedrate Override | | IC/IO |
| Load Control Active | | Q2 |
| Feedhold Request | | Q3 |
| Warning Level Exceeded | | Q4 |
| Alarm Level Exceeded | | Q5 |
| Control Solution Error | | Q6 |
| Base Speed Error | | Q7 |
| Command Error | | Q8 |
| Function Error | | Q9 |
| Initialization Error | | Q10 |

Figure 10:
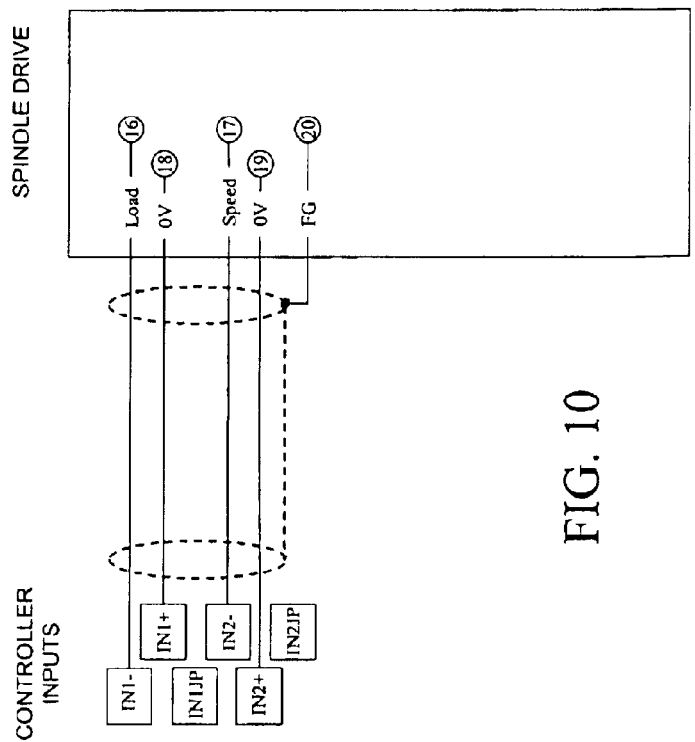
FIG. 10 illustrates an analog input connection between the adaptive control module and spindle amplifier.

The first two inputs referenced in the table above are the analog inputs that are connected to the spindle amplifier 66. The spindle amplifier 66 should be able to output an analog 0–10V signals, which are representative of the spindle load and speed. These outputs are made available even on the most basic amplifiers to allow connection of analog load and speed meters. The analog connections can be accomplished using a 4-core twisted pair cable with an overall shield. The minimum wire size recommended is 24AWG. FIG. 10 illustrates an exemplary analog input connection between the adaptive control module 60 and spindle amplifier 66.

The remainder of the controller 60 inputs is mapped outputs for the PMC 90. Although the inputs to the controller 60 can accept either sourcing or sinking type outputs, source type outputs will mean positive logic can be used on the PMC 90. To use sinking type outputs, pull-up resistors will be needed at each PLC 90 input point. Therefore, sourcing type output modules should be used with the adaptive control module 60. FIG. 11 illustrates an exemplary digital input connection between the adaptive control module 60 and programmable machine controller 90.

Figure 12:
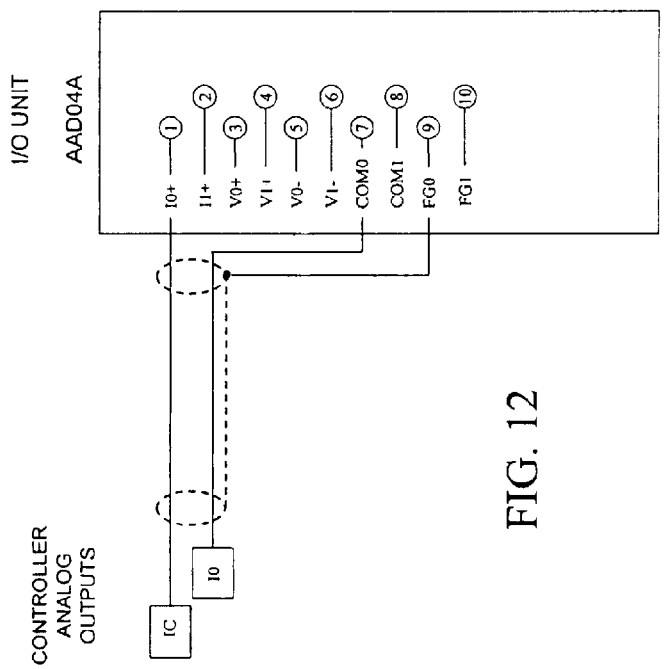
FIG. 12 illustrates analog output connection between the adaptive control module and spindle amplifier.

The first output point referenced in Table 1 is the analog feedrate override from the adaptive controller 60. This point should be connected to a spare analog input point on the CNC 70 control or communicated digitally through the machine's programmable machine interface I/O structure. The analog connection should be accomplished using a similar cable as described for the analog inputs, except that only one twisted pair is needed. FIG. 12 illustrates an exemplary analog output connection between the adaptive control module 60 and spindle amplifier 66.

Figure 13:
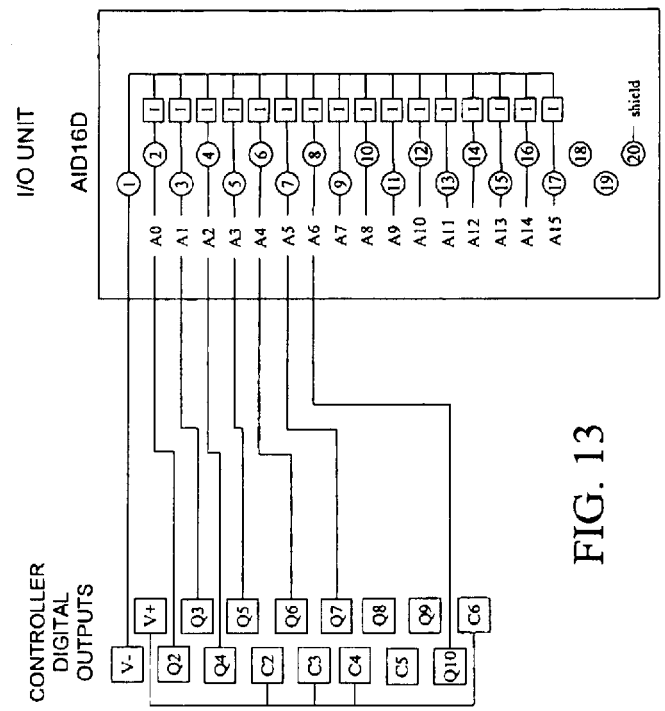
FIG. 13 illustrates a digital output connection between the adaptive control module and programmable machine controller.

The remaining outputs of the adaptive controller 60 will be mapped inputs for the PMC. Since the outputs from the adaptive controller are relays, they can drive either sourcing or sinking type inputs, sink type inputs will mean positive logic can be used on the PMC 90. Therefore sinking type input modules should be used with the adaptive control module 60. FIG. 13 illustrates an exemplary digital output connection between the adaptive control module and programmable machine controller.

The connections between the CNC machine 70 and the adaptive controller 60 will vary, depending on the application and the particular needs of the CNC machine. All three types of configuration need to have some method of activating the functions within the adaptive controller 60. Although the stand alone configuration can activate these functions directly from mechanical switches provided by the integrator, operations can be made simpler by utilizing programmable activation from a part program or a manual data input (MDI) interface.

Activation of these features is typically performed using M-code or G-code programming. To make this possible, the integrator must add PMC logic to the machine interface. In each of these configurations, tooling information is provided to the adaptive control module 60 through PMC 90 memory. This memory is either in the form of D-Words (retentive information) or R-Words (non-retentive information). The choice of memory type and location is up to the personnel integrating the adaptive control module 60 into the CNC machine 70. The choice should be based on how the tooling management is provided and the unallocated memory space within the PMC 90.

One other area of memory within the CNC 70 is used to communicate CNC part program information to the adaptive control module 60. A free macro variable should be chosen to allow communication of part program information to the adaptive control module 60. The integrator also has a choice as whether to make this information retentive or non-retentive. If a macro variable number is chosen in the area of the #100's, the information will be lost at power off and may be cleared during a CNC reset (settable by parameter). If the macro variable chosen is in excess of #500, the information will be retained after powering up the control.

The setup of the adaptive control module 60 can be categorized into three areas. These three areas are the hardware, application software and the user interface software. Of these, the most time will be spent in setting up the user interface software.

To initialize the application software and preset the internal working registers, the user or integrator can momentarily apply power to the command strobe input (I4) while ensuring that power is applied only to the command mode bit (I5). This condition will force the application software in the adaptive controller to preset the internal working registers to initial operating values.

Further configuration of the application can be performed by using the User Interface software to alter the internal registers to suit specific application needs. The user interface software can be used by all configurations of the adaptive controller. In particular, during the setup phase, the software is used to determine correct controller operation and to tune the adaptive control for the CNC machine. The user interface software can be installed on the CNC machine if the proprietary customization feature version is used, or on a PC if the open system version of the software is used. In either case, the operation of the software is similar.

The next step in the setup of the user interface software is to establish the scaling and controller limits used by the software. There are three items, which can be scaled to suit the CNC machine application. The first item is the "Digital to Analog Converter (DAC) Scaling @ 100%". This value is the internal representation of 100% within the adaptive controller module.

The other two items ("Load Max %" and "FOV Max %") can be set to any value the user desires. These items scale the bar graphs on the user interface page to be full scale at this setting. A typical setting for these items is 255.

The "Control Limits" set the maximum thresholds for the Set Point and Alarm limits. These limits are typically based on the machine limits. These settings provide some protection against user entry errors in the tool table information. If the tool table information or user input exceeds these values, the software will "clamp" these settings to their respective values. The following are typical settings for "Control Limits":

| | |
|---|---|
| Setpoint Limit | 150 |
| Alarm Limit | 250 |

The final area to setup in the user interface is the PID settings within the adaptive controller. This is accomplished by returning to the adaptive-user interface screen 40. The first items to set on this screen are for the D/A converter on the PLC controller 60. Example settings are as follows:

| | |
|---|---|
| Output @ 100%: | 12600 |
| Initialize Time: | 8 ms |

The next item on UI screen 40 has to do with spindle speed. The adaptive control module 60 is designed to be operated above the base speed of the spindle motor 68. This item sets the base speed check of the spindle as a percentage of its maximum speed. The base speed percentage should be set as a percentage of maximum speed for the spindle used on the CNC machine 70. An example setting is as follows:

| | |
|---|---|
| Maximum Spindle Speed: | 6000 RPM |
| Base Speed of Spindle: | 600 RPM |
| Base Speed: | 10% |

The last items that need to be set on UI screen 40 are for the PID control algorithm. These items set the characteristics under which the PID controller operates. The following values are typical for standard operation; only a few of these will ever need adjusting:

| | |
|---|---|
| CV Bias: | 0 counts |
| Dead Band: | 50 counts |
| CV Upper Clamp: | 17400 counts |
| CV Lower Clamp: | −12600 counts |
| Minimum Slew Time: | 0 sec. |
| Sample Period: | 10 ms |
| Arm Point: | 5% |

Out of the above values, only three items should ever need adjustment. The "CV Bias" is used when there is an output voltage from the spindle amplifier 66 with the spindle at zero RPM. Under normal circumstances, the PID algorithm can operate satisfactorily even with moderate bias on the spindle load. For this reason, this value should never need to be changed.

The "Dead Band" setting provides the ability to establish an area of load change, which the PID controller will not attempt to correct. This setting is not normally used, but can be set to ignore small changes in load to create more stable operation at higher gains.

The "Arm Point" is the setting that will most likely be changed by the user or person setting up the controller. The "Arm Point" should be set to be greater than the "idle" load of the spindle (load when the spindle is running in free air) and lower than the minimum load in which adaptive control should occur. The "idle" load of the spindle should be checked at various speeds and gear ranges. It might be found that this value will need to be adjusted based on the part, spindle speed and gear range desired under adaptive control.

The tuning of the PID gains within the adaptive controller 60 can be approached using several different methods. There have been many articles and research performed on the tuning of PID control loops. These can be categorized into analytical and practical approaches. The analytical approaches are based on the ability to instrument and determine "closed loop" response. These methods work well but can be confusing to persons not versed in control theory. The following is a practical approach to tuning the adaptive control module.

Before starting the tuning process, the load monitor feature should be tested. In this manner, not only can the spindle load calibration be checked, but also the load monitor interface prior to cutting. The first step should be to use a battery box to simulate the load input to the adaptive controller 60. The wiring from the IN1+ and IN1− analog inputs are removed and the battery box is connected to these points. The battery box is turned on and a 5V signal is applied to the adaptive controller. The spindle load bar graph should show about 50% and "Analog Load" in the control monitor should be around 16000. These values are only approximate.

To verify that the load monitor feature is properly implemented, alarm and warning levels are established using the method provided by the person who integrated this feature. The feature is activated using the M-Code, G-Code or switch that the integrator has provided. The battery box voltage is increased until the "Warning" output on the Control Monitor is activated. The spindle load read in the bar graph display should be equal or greater than the value set for the "Warning Limit". If the warning level indicator does not activate, the installation should be rechecked before continuing.

Bringing the voltage level on the battery box lower than the "Warning Limit", the "Warning" output on the control monitor should deactivate. If this operation appears to work correctly, the user should proceed to the next step.

With the battery box still connected, the voltage is increased until the "Alarm Limit" is exceeded. This time several indicators should activate. If the "Warning Limit" is lower than the "Alarm Limit", the "Warning", "Alarm" and "FdHold" outputs should all be active. Turning off the battery box the "Alarm" and "FdHold" outputs are still active. This is normal operation and these indicators will not deactivate until the "Reset" input on the adaptive controller is input.

If the above checks are satisfactory, the user should then proceed with tuning. The following is a practical approach that can be used to determine the optimum gain settings by performing actual cutting and observing the stability of the loop control using the user interface screen. The first step is to select a material and tool that will allow up to 75% continuous spindle load to be achieved during cutting. On most milling machines this will mean some type of mild steel and the appropriate cutter.

The tuning will be performed at several load levels, but the tuning process will be the same. The process begins by calculating a volumetric feed (depth and width of cut) that will, at a fixed feedrate, give an approximate 25% load on the spindle. If the user is not sure of the proper feedrate and volume of cut, different values of depth should be tried and the feed rate override should be used to determine a feed and volume that will give approximately a 25% load on the spindle.

Next, the Set Point of the adaptive load control feature should be set to 25% target load. At least one cutting pass across the part should be made to make sure the spindle and feedrate are correct. Next, the load control feature should be enabled. The user interface should indicate that the feature is enabled under the "Adaptive Monitor" portion of the display. When the load being monitored by the controller is greater than the "Arm Point" set, the load control feature should become active. This can be confirmed by viewing the "Active" status under the "Adaptive Monitor" portion of the display.

Once the load control feature is active, the feedrate control will try to adjust the path feedrate to attain the target Set Point load set by the user. For an under-tuned condition, the load control feature will be very "sluggish" and might not attain the desired target "Set Point".

The "Proportional Gain" of the controller 60 is adjusted first to maintain stable operation and provide some margin of stability. To accomplish this task, the user goes to the "PID Setup" screen 40 and increases the "Proportional—PID Gain" (steps of 1 to 10 counts are used initially). Again, a cut at the part is made and the spindle load is watched. If the load is steady, the loop is stable and the gain can be increased further. If the load changes abruptly from a low load to a large load, alternating back and forth, the loop is unstable. If an unstable loop operation exists, the cut should be stopped (i.e. feed hold) and the "Proportional—PID Gain" should be decreased by approximately 10%.

The user should continue to adjust the "Proportional—PID Gain" and cut the part until the maximum stable setting is found (i.e., no extreme load oscillations) and then decrease the gain setting by approximately 10%. This should provide stable operation of the proportional section of the PID loop control with a 10% margin of safety.

The next step is to adjust the "Integral—PID Gain". The user proceeds as in the tuning of the proportional gain, but this time the integral gain is adjusted. The integral gain can be adjusted in steps of 10 to 100. The user again finds the maximum setting that will provide stable operation and then backs off the setting by approximately 10%.

The final step is to adjust the "Differential—PID Gain". The user again proceeds as in the tuning of the proportional gain, but this time adjusts the differential gain. The differential gain is not normally used because its sensitivity is very high. Therefore, the user might find that even one count of gain will cause unstable operation. This gain is set to zero in most cases.

Once the loops have been tuned at a 25% load, loop stability should be tested at 50%, 75% and 100% loads and readjusted if necessary. After tuning the PID loops, stable accurate control will be attained by the load control feature. In some cases, the user might find that different gear ranges might degrade the tuning and re-tuning of the loops should be performed.

The corresponding structures, materials, acts, and equivalents of all means plus function elements in the claims below are intended to include any structure, material, or acts for performing the function in combination with other claim elements as specifically claimed.

Those skilled in the art will appreciate that many modifications to the exemplary embodiments of the present invention are possible without departing from the spirit and scope of the present invention.

What is claimed is:

1. A method for adaptively controlling the volumetric removal of material from a workpiece during a machining operation by a computer-controlled tool, comprising the steps of:

determining a steady state load on a spindle drive when the tool is not in an active cutting mode;

measuring a turning load of the spindle during active cutting;

adjusting the turning load of the spindle based on the steady state load;

determining a new path feed rate for the workpiece as a function of the adjusted spindle load using a control algorithm; and adjusting a current path feed rate based on the determined new path feed rate by asserting signals from a motion controller.

2. The method for adaptively controlling of claim 1 further comprising the steps of detecting the spindle load using a load detection mechanism and providing an analog or digital representation as a percent of a maximum spindle load.

3. The method for adaptively controlling of claim 1 further comprising the steps of detecting a spindle velocity using a speed detection mechanism and providing an analog or digital representation as a percent of maximum spindle velocity.

4. The method for adaptively controlling of claim 3 further comprising the step of filtering the spindle load detection by neglecting small changes in the spindle load.

5. The method for adaptively controlling of claim 1 further comprising the step of limiting the rate of change of the determined path feed rate by clamping the determined path feed rate such that the current path feed rate can change by only a preset amount during each successive iteration of the control algorithm.

6. The method for adaptively controlling of claim 1 further comprising the step of limiting the maximum and minimum values of the determined path feed rate.

7. The method for adaptively controlling of claim 1 wherein an adaptive control function is automatically enabled by determining if the adjusted spindle load exceeds a first preset limit.

8. The method for adaptively controlling of claim 7 wherein the adaptive control function is automatically disabled by determining if the adjusted spindle load drops below a second preset limit.

9. The method for adaptively controlling of claim 8 wherein the second preset limit is determined from the first preset limit and an offset, thereby creating a hysteresis in the automatic enabling and disabling of the adaptive control function and eliminating resonance in the activation of the adaptive control function.

10. The method for adaptively controlling of claim 1 further comprising the step of overriding a commanded turning load for the spindle by an input into the control algorithm.

11. The method for adaptively controlling of claim 1 further comprising the steps of determining when the adjusted spindle load exceeds a preset warning load level and providing a signal generated by the adaptive control function to an interface.

12. The method for adaptively controlling of claim 1 further comprising the steps of determining when the adjusted load exceeds a preset alarm load level thereby disabling the adaptive control function and asserting a signal to the motion controller to stop each axis movement immediately.

13. The method for adaptively controlling of claim 12 further comprising providing a signal from the adaptive controller to an interface.

14. The method for adaptively controlling of claim 12 further comprising the steps of presetting the alarm detection and disabling the adaptive control function through an input to the adaptive control function.

15. The method for adaptively controlling of claim 3 further comprising the steps of detecting when the spindle drive velocity drops below a preset value and providing a signal from the adaptive controller to an interface.

16. The method for adaptively controlling of claim 15 further comprising the step of providing an alternate value for at least one of a plurality of control system gains when the spindle drive velocity drops below a preset value.

17. The method for adaptively controlling of claim 1 further comprising the steps of determining when a calculated feedrate override drops below a preset minimum feedrate override level thereby disabling the adaptive control function, and asserting a signal to the motion controller to stop each axis movement immediately.

18. A system for on demand adaptive control of machining operations by a computer-controlled tool on a workpiece, comprising:

a spindle drive that controls a spindle motor for the tool and outputs a signal that is representative of the spindle load;

an adaptive controller for monitoring the spindle load and determining a path feedrate for the workpiece in relation to the tool;

a demand switch for automatically enabling the adaptive control based on the spindle load; and a motion controller for adjusting the path feedrate in response to an output signal from the adaptive controller.

19. The system for on demand adaptive control of claim 18 further comprising a plurality of axis motors, each axis motor controlling feedrate motion of the workpiece based on axis control signals received from the motion controller.

20. The system for on demand adaptive control of claim 18 wherein the motion controller includes a spindle control component and an axis control component.

21. The system for on demand adaptive control of claim 18 wherein the adaptive controller includes control logic that controls the machining operations with a closed loop, negative feedback control algorithm.

22. The system for on demand adaptive control of claim 21 wherein the control logic includes a proportional/differential/integral (PID) algorithm.

23. The system for on demand adaptive control of claim 22 wherein a differential between a set point and a process variable is provided as an input to the PID algorithm to determine a control variable supplied to the motion controller to adjust the path feedrate.

24. The system for on demand adaptive control of claim 23 wherein the set point is a commanded load to be held by the spindle drive.

25. The system for on demand adaptive control of claim 23 wherein the process variable is based on a scaled spindle load.

26. The system for on demand adaptive control of claim 18 wherein the adaptive control is deactivated when the spindle load exceeds a preset limit.

27. The system for on demand adaptive control of claim 18 wherein the adaptive control is deactivated when the spindle load decreases below a preset limit and an offset value and activated when the spindle load increases above the preset limit and offset.

28. The system for on demand adaptive control of claim 23 wherein the adaptive control logic includes a dead band module that suppresses the input to the PID algorithm when the differential is lower than a threshold value.

29. The system for on demand adaptive control of claim 23 wherein the adaptive control logic includes a slew control module that limits the value of the control variable that is supplied to the motion controller if the control variable changes by an amount greater than a slew amount between successive iterations of the control logic.

30. The system for on demand adaptive control of claim 23 wherein the adaptive control logic includes a clamp module that limits the maximum value of the control variable if the control variable exceeds an upper limit and limits the minimum value of the control variable if the control variable drops below a lower limit.

31. The system for on demand adaptive control of claim 23 wherein the adaptive control logic includes a scaling module to scale the control variable to match the path feedrate command input of the motion controller.

32. A system for on demand adaptive control of machining operations by a computer-controlled tool on a workpiece, comprising:

a spindle drive that controls a spindle motor for the tool and outputs a signal that is representative of the spindle load;

an adaptive controller for monitoring the spindle load and determining a path feedrate for the workpiece in relation to the tool;

a demand switch for automatically enabling the adaptive control based on the spindle load;

a motion controller for adjusting the path feedrate in response to an output signal from the adaptive controller; and an interface for setup and monitoring of the adaptive controller.

33. The system for on demand adaptive control of claim 32 wherein the interface comprises a load monitor module, an adaptive monitor module, a control monitor module and a communications monitor module.

34. The system for on demand adaptive control of claim 33 wherein the load monitor module displays an operating condition of the spindle motor.

35. The system for on demand adaptive control of claim 33 wherein the adaptive control module displays a status of the demand switch and an operational condition of the motion controller.

36. The system for on demand adaptive control of claim 33 wherein the control monitor module displays an image of the motion controller's inputs and outputs.

37. The system for on demand adaptive control of claim 33 wherein the communications monitor module displays a total number of packets transmitted between the interface and the motion controller.

38. The system for on demand adaptive control of claim 32 wherein the interface provides a display screen for an operator to setup characteristics of a proportional/integral/derivative (PID) control algorithm in a control logic module of the adaptive controller.

39. The system for on demand adaptive control of claim 32 wherein the adaptive controller and motion controller are fully integrated to provide both interface information and tooling information.

40. The system for on demand adaptive control of claim 32 wherein the adaptive controller and motion controller are partially integrated so that the adaptive controller can operate with custom tool interfaces.

41. The system for on demand adaptive control of claim 32 wherein the adaptive controller and motion controller are not integrated and the interface to select target and limit values for the motion controller is provided through physical input devices on the adaptive controller.

* * * * *